US012661822B2

(12) United States Patent
Leeb et al.

(10) Patent No.: US 12,661,822 B2
(45) Date of Patent: Jun. 23, 2026

(54) CUTTING ELEMENT FOR A SAW CHAIN AND METHOD FOR THE PRODUCTION THEREOF

(71) Applicant: VOESTALPINE PRECISION STRIP GmbH, Böhlerwerk (AT)

(72) Inventors: Bernhard Leeb, St. Peter in der Au (AT); Gerhard Röcklinger, Biberbach (AT)

(73) Assignee: VOESTALPINE PRECISION STRIP GmbH, Böhlerwerk (AT)

( * ) Notice: Subject to any disclaimer, the term of this patent is extended or adjusted under 35 U.S.C. 154(b) by 1179 days.

(21) Appl. No.: 17/613,838

(22) PCT Filed: May 28, 2020

(86) PCT No.: PCT/EP2020/064869
§ 371 (c)(1),
(2) Date: Nov. 23, 2021

(87) PCT Pub. No.: WO2020/239925
PCT Pub. Date: Dec. 3, 2020

(65) Prior Publication Data
US 2022/0250273 A1 Aug. 11, 2022

(30) Foreign Application Priority Data
May 28, 2019 (EP) .................................... 19177092

(51) Int. Cl.
| | |
|---|---|
| *C21D 9/24* | (2006.01) |
| *B23D 65/00* | (2006.01) |
| *B27B 33/14* | (2006.01) |
| *C22C 38/02* | (2006.01) |
| *C22C 38/04* | (2006.01) |
| *C22C 38/06* | (2006.01) |
| *C22C 38/22* | (2006.01) |
| *C22C 38/24* | (2006.01) |

(52) U.S. Cl.
CPC ............ *B27B 33/142* (2013.01); *B23D 65/00* (2013.01); *C21D 9/24* (2013.01); *C22C 38/02* (2013.01); *C22C 38/04* (2013.01); *C22C 38/06* (2013.01); *C22C 38/22* (2013.01); *C22C 38/24* (2013.01); *C21D 2211/001* (2013.01)

(58) Field of Classification Search
CPC ...................................................... C21D 9/24
See application file for complete search history.

(56) References Cited

U.S. PATENT DOCUMENTS

| | | |
|---|---|---|
| 3,918,928 A | 11/1975 | Kiyonaga et al. |
| 4,058,650 A | 11/1977 | Kiyonaga et al. |
| 2005/0161125 A1 * | 7/2005 | Ozaki ..................... C22C 38/04 |
| | | 148/334 |

FOREIGN PATENT DOCUMENTS

| | | | |
|---|---|---|---|
| CN | 1648276 A | 8/2005 | |
| DE | 4303004 A1 * | 8/1994 | ......... B23K 15/0093 |
| DE | 102010011837 A1 | 9/2011 | |
| EP | 0592389 B1 | 2/1996 | |
| EP | 1083031 B1 | 6/2006 | |
| EP | 2052821 B1 | 12/2012 | |
| EP | 2992990 A1 | 3/2016 | |
| WO | 2013/127542 A1 | 9/2013 | |

OTHER PUBLICATIONS

English machine translation of DE 4303004 A1 of Bolte (Year: 1994).*
International Search Report issued in international patent application No. PCT/EP2020/064869, mailed Sep. 18, 2020, 4 pages.
Written Opinion issued in corresponding international patent application No. PCT/EP2020/064869, mailed Sep. 18, 2020, 5 pages.

* cited by examiner

*Primary Examiner* — Jophy S. Koshy
(74) *Attorney, Agent, or Firm* — Day Pitney LLP; George Chaclas; Anthony A. Kassas

(57) ABSTRACT

A cutting member for a saw chain and a method for the production thereof, the cutting member comprising a support part made of a steel alloy and a cutting part welded to the support part along a welding connection made of a high speed steel. The steel alloy of the support part is a tool steel that has the following composition (specifications in % by weight):

| | |
|---|---|
| Carbon (C) | 0.4 to 1.0 |
| Silicon (Si) | up to 1.8 |
| Manganese (Mn) | up to 0.6 |
| Chromium (Cr) | 4.5 to 12 |
| Molybdenum (Mo) | up to 3 |
| Vanadium (V) | up to 2 |

Iron (Fe) and accompany elements caused by melting and impurities as the remainder. The steel alloy of the support part in a quenched and tempered state has a hardness of more than 600 HV and a tensile strength of more than 2000 MPa as a result of curing at a suitable temperature above the austenitizing temperature of the high speed steel.

8 Claims, 3 Drawing Sheets

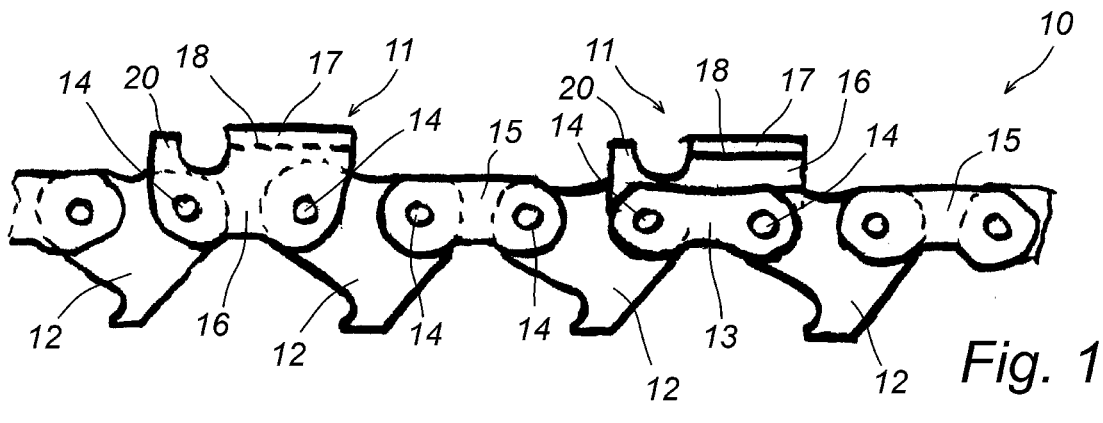
*Fig. 1*
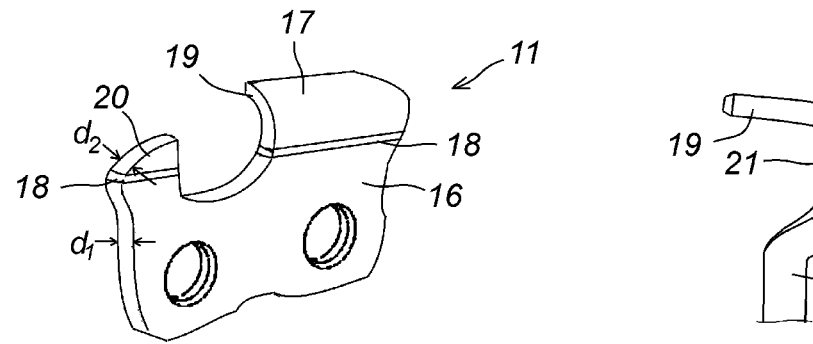
*Fig. 2*    *Fig. 3*
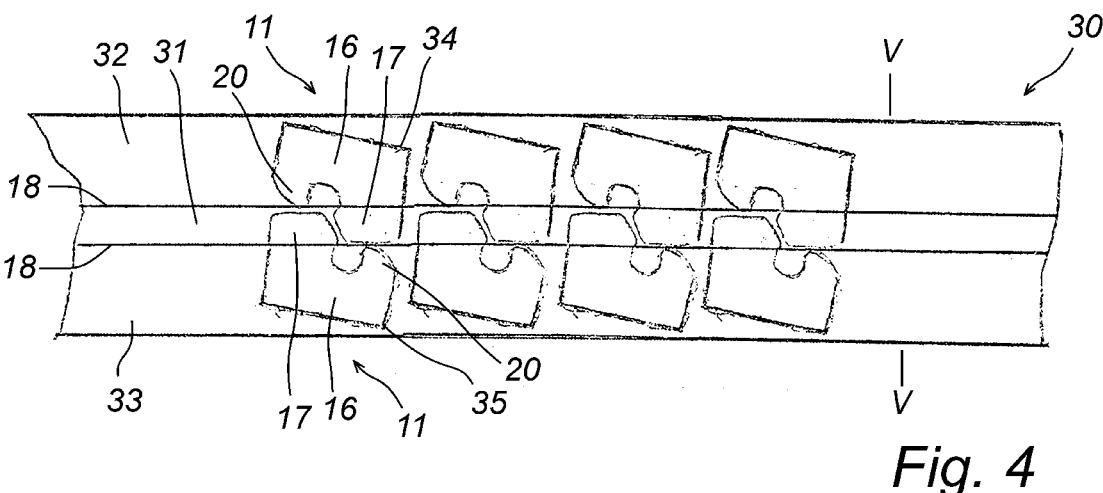
*Fig. 4*

CUTTING ELEMENT FOR A SAW CHAIN AND METHOD FOR THE PRODUCTION THEREOF

CROSS-REFERENCE TO RELATED APPLICATIONS

This application is a U.S. national stage application under 35 U.S.C. 371 of International Application No. PCT/EP2020/064869 filed on May 28, 2020, which in turn claims priority to EP Application No. 19177092.4 filed on May 28, 2019, the contents of which are incorporated by reference herein in their entirety for all purposes.

FIELD OF THE DISCLOSURE

The present disclosure relates to a cutting member for a saw chain, a saw chain equipped with such cutting members for motorised chainsaws and a method for producing such cutting members.

BACKGROUND

Motorised chainsaws are saws which have a closed link chain provided with cutting edges as cutting or separating means, said link chain revolving on a longitudinally extended guide rail. The link chain usually comprises drive links, cutting members arranged alternatingly on the left-hand side and right-hand side and optionally also interlinks. The individual links of a saw chain are each moveably connected to bolts or rivets in opposition to one another.

The drive of the saw chain is usually carried out by an internal combustion engine or electric engine that drives a pinion arranged on a side of the guide rail and interacting in a force transferring manner with the drive links of the saw chain.

The cutting members usually consist of a cutting head and a depth limiter formed upstream in a tooth-like manner. The cutting head comprises the tooth blades necessary for the machining sawing function. The tooth blades are typically formed as half-chisel teeth with a bent arrangement of roof cutting edge and chest cutting edge or as full-chisel teeth with a shard-edged transition from roof and chest cutting edges. In both designs, the tooth roof serves to raise the wood shaving, wherein, in contrast, the chest cutting edge takes on the lateral separation of the material to be cut. The shaving thickness is determined here by the distance between the roof cutting edge and the depth limiter.

Also known are cutting members designed without a bent cutting head and without depth limiters. Such alternative cutting members are described, for example, in the international patent application WO2013/127542 A1 or in the European patent application EP 1 083 031 B1.

Usually, the links of a saw chain for motorised chainsaws, in particular for woodwork, are produced from low-alloyed heat treatable steel. The cutting edge retention of such saw chains is, however, minimal, such that a frequent re-sharpening is necessary, which, in the case of these saw chains, can be carried out by an experienced user. Improvements to the service life with regard to attrition resistance, fatigue resistance, solidity, and an improved low-temperature toughness are known from the prior art. Thus, attempts have already been made to improve the attrition resistance of the cutting teeth by means of at least partially coating, e.g. hard chromium plating, of individual cutting teeth. However, the hard chromium plating of individual teeth is classed as disadvantageous from an ecological point of view. Furthermore, cutting members have been produced from low-alloyed quenched and tempered steel, wherein the cutting heads are produced from carbide plates and are connected in a firmly bonded manner by means of brazing solder. Such an implementation is described in the European patent application EP205282161, for example. In this context, carbide plates made of fine-grained tungsten carbide, which are held together by cobalt, for example, are most significant in terms of quantity.

In the European patent application EP 0 592 389 B1 or the German patent application DE4303004C2 or DE 10 2010 011 837 A1, the saw chain links described are punched out of a material compound strip that consists of a cost-effective ferritic steel strip, for example, as the support part, onto which a cutting part has been welded in the form of a highly wear-resistant high speed steel wire or strip. The cutting members are then cured and tempered with the parameters required for the quenching and tempering of the high speed steel.

With conventionally commercially available material compound strips, a very high degree of wear resistance of the high speed steel is obtained by the quenching and tempering process on the cutting part, yet only tensile strengths of 1700 MPa are obtained for the support part. Such strength values on the support part are not sufficient for use in saw chains. Thus, saw chain links made of conventional material compound materials cannot be used despite outstanding attrition resistance of the cutting part due to the insufficient tensile strength of the support material. In addition, it underlies this that a correspondingly high austenitizing temperature must be used for the high speed steel alloy used, which, however, already has a grain-coarse or damaging effect on the support alloy.

Thus, the technical problem underlying the present disclosure is the task of providing cutting members for saw chains made of a material compound strip that has a cutting part made of an attrition-resistant high speed steel and a support part made of a more cost-effective steel material with high tensile strength. Particular attention is paid to the quenching and tempering ability of the support material, which allows for quenching and tempering that, on the one hand, has a sufficiently high attrition resistance of the high speed steel and, on the other hand, a quenched and tempered support part with high tensile strength and potential for the necessary heat treatment.

SUMMARY

This technical problem is solved by the cutting member for a saw chain having the features of the present claims. Advantageous developments of the cutting member according to the disclosure are the subject matter of the dependent claims.

The present disclosure describes cutting members for saw chains from a material compound strip which, on the one hand, comprises a wear-resistant high speed steel and, on the other hand, a steel material with correspondingly optimised properties for the support part, wherein the steel material of the support part in the quenched and tempered state has a hardness of more than 600 HV and a tensile strength of more than 2000 MPa.

With the cutting member according to the present disclosure, the support material provides increased tensile strength, which emerge from the higher service lives of the saw chain resulting from use of high speed steel for the cutting part.

The consideration underlying the present disclosure is the task of providing a support material that withstands the increased load and of selecting a heat treatment not in the sense of optimising the cutting part, but rather in the sense of optimising a combination of the cutting part and support part. To do so, a support material is chosen, according to the present disclosure, that is not designed for the usual temperatures required for bimetal curing. It has surprisingly been found that, at a temperature above the austenitizing temperature of the high speed steel yet below the temperature required for complete hardening of the high speed steel, the desired hardness of the support material of more than 600 HV and tensile strength of more than 2000 MPa can be achieved. Thus, in comparison to classic high speed steel curing, the curing is carried out at a somewhat lower temperature, wherein sub-curing of the high speed steel of the cutting part is optionally accepted for optimising a combination of cutting part and support.

According to the present disclosure, the steel alloy of the support part of the cutting member is a tool steel. Surprisingly, it has been found that specific tool steel alloys, in conditions necessary for the quenching and tempering of high speed steel, can obtain hardness values of more than 600 HV and a tensile strength of more than 2000 MPa. Such steel alloys are thus particularly suitable for the support part of the material compound strip for the cutting members according to the present disclosure.

Low-alloyed steel alloys used up until now have too low attrition resistance or strength values, somewhat more highly alloyed cold functioning steels fail under thermal load; especially in the field of hard wood or when higher cutting efforts are required.

The tool steel alloy found here of the support part has the following composition (specifications in percent by weight):

| Carbon (C) | 0.4 to 1 |
| Silicon (Si) | up to 1.8 |
| Manganese (Mn) | up to 0.6 |
| Chromium (Cr) | 4.5 to 12 |
| Molybdenum (Mo) | up to 3 |
| Vanadium (V) | up to 2 |

Iron (Fe) and accompanying elements caused by melting and impurities as the remainder.

Preferably, the steel alloy of the support part has the following composition (specifications in percent by weight):

| Carbon (C) | 0.45 to 0.8 |
| Silicon (Si) | up to 1.3 |
| Manganese (Mn) | up to 0.6 |
| Chromium (Cr) | 6 to 10 |
| Molybdenum (Mo) | up to 1.6 |
| Vanadium (V) | up to 1 |

Iron (Fe) and accompanying elements caused by melting and impurities as the remainder.

The cutting members can be used in saw chains for standard operating petrol chainsaws, for chainsaws with electric or battery operation or with alternative drive systems.

The services lives of the resulting saw chains exceed the service lives of conventional chains made of carbon steel many times over and are thus suitable, in particular, for use in machines. On the one hand, in the case of tree felling in harvester operation, the higher attrition resistance has a very positive impact with regard to abrasive impurities by e.g.

sand or soil in the felling region and, on the other hand, in the field of hardwood and in further processing of log saws in the sawn wood and pallet industry e.g. for the exact trimming of lumber packages.

With the use of high speed steel that has now become possible as the cutting material, not only can the attrition resistance and thus the cutting toughness of the cutting members be improved, but, due to the higher tooth hardness, the cutting performance of the saw chain can be correspondingly increased by geometry variations. In addition, the resulting cutting forces of the cutting members are significantly reduced at the cutting edge due to lower attrition progress, which specifically has an impact in the event of battery powered chain saws on a clearly increased operation performance.

Due to the high-strength steel alloy of the support part, the depth limiter has an increased attrition resistance in the cutting member according to the present disclosure in comparison to the cutting members known from the prior art. Particularly advantageously, the depth limiter can be formed from high speed steel on its contact region with cut material, in order to additionally improve the attrition resistance.

With the saw chains according to the present disclosure, cutting material in which there are metallic foreign bodies, such as nails, screws or clamps, for example, can also be cut. The saw chain is thus also particularly well suited to demolition work, building and mining engineering or generally harsh applications.

According to a preferred implementation, the steel alloy of the support part in the quenched and tempered state has a hardness of between 630 and 750 HV and a tensile strength of between 2100 and 2500 MPa.

Preferably, the high speed steel used for the cutting part is also optimised to the effect that its quenching and tempering can be carried out at temperatures which, on the one hand, ensure a high attrition resistance of the cutting part, yet on the other hand do not disadvantageously influence the fatigue strength of the support part.

Preferably, a high speed steel is used for the cutting part of the cutting member according to the present disclosure, which has the following composition (specifications in percent by weight):

| Carbon (C) | 0.5 to 1.1 |
| Silicon (Si) | up to 0.5 |
| Manganese (Mn) | up to 0.5 |
| Chromium (Cr) | 3.5 to 4.5 |
| Molybdenum (Mo) | 2 to 6 |
| Vanadium (V) | 0.5 to 3.0 |
| Tungsten (W) | up to 3 |
| Cobalt (Co) | up to 10 |

Iron (Fe) and accompanying elements caused by melting and impurities as the remainder.

Usually, the cutting part and the support part of the cutting members of a saw chain have the same thickness, such as when they are produced from bimetal. According to a variant of the present disclosure, the high speed steel cutting part and an optionally present depth limiter made of high functioning steel can have a smaller thickness than the support part. The thickness of the cutting part can be, for example, 40-90%, preferably 50-80% of the thickness of the support part. The smaller thickness of the cutting part has the advantage that the production costs are reduced due to the material savings connected with this with expensive high speed steel, which comes into effect with more largely dimensioned cutting members. Furthermore, the bending ability of the cutting part is increased, such that smaller curvature radii can be implemented.

The present disclosure also relates to a saw chain for motorised chainsaws, which comprises the drive members or cutting members described above and optionally also interlinks, which are moveably connected to one another with bolts or rivets.

The present disclosure also relates to the use of the saw chain in log saws, in combine harvesters, in lumber package saws, in battery-powered chainsaws and in chainsaws for demolition or in harsh working environments.

Finally, the present disclosure also relates to a method for producing cutting members, wherein at least one first central flat strip material made of high speed steel on its two strip edges are welded to one another along a second or third flat strip material made of a steel alloy that can be quenched and tempered and is unbreakable by means of welded seams for forming a material compound strip. The cutting members are removed from the compound material in such a way that the support part of a cutting member consists of the second or third flat strip material and the cutting part of a cutting member of the first flat strip material. The removal is preferably carried out by the punching out or cutting out of cutting member blanks. After the corresponding reshaping steps, the cutting members are heated up, cooled down and optionally tempered several times for curing at a temperature above the austenitizing temperature of the high speed steel. Here, the temperature is above the austenitizing temperature of the high speed steel, preferably more than 1000° C. and particularly preferably this temperature ranges from 1050° C. to 1200° C. In order to reach the required functioning hardness or attrition resistance, the cutting members are optionally tempered several times at 500° C.-600° C. The cutting members are finally partially ground or sharpened in an inherently known manner.

The second and third flat strip materials consist of the steel alloy described herein that can be quenched and tempered. The second and third flat strip materials preferably consist of the same alloy.

The depth limiter can consist of the second or third flat strip material. Preferably, the cutting member blanks are, however, removed from the material compound strip in such a way that the depth limiter at least partially consists of the flat strip material made of high speed steel.

The flat strip materials usually have the same thickness. If, according to the variant described above of the cutting member, the thickness of the cutting part is to be designed to be smaller than the thickness of the support part, the strip materials are preferably already chosen with a corresponding thickness. In a variant of the method according to the present disclosure, the first flat strip material made of high speed steel has a smaller thickness than the second and third flat strip materials. Preferably, the thickness of the first flat strip material is 40-90%, particularly 50-80% of the thickness of the second and third flat strip materials. When welding strip materials of different thicknesses, distinct steps can emerge on the welded seams, which can be flattened in suitable post-processing steps, for example with the aid of a smoothing roller. Alternatively or additionally, the hems of the thicker second and third strip materials can be chamfered in order to form the transition more consistently.

BRIEF DESCRIPTION OF THE DRAWINGS

Various aspects of the present disclosure are discussed herein with reference to the accompanying Figures. It will be appreciated that for simplicity and clarity of illustration, elements shown in the drawings have not necessarily been drawn accurately or to scale. For example, the dimensions of some of the elements can be exaggerated relative to other elements for clarity or several physical components can be included in one functional block or element. Further, where considered appropriate, reference numerals can be repeated among the drawings to indicate corresponding or analogous elements. For purposes of clarity, however, not every component can be labelled in every drawing. The Figures are provided for the purposes of illustration and explanation and are not intended as a definition of the limits of the disclosure.

FIG. 1 is a side view of a cut-out of a saw chain.

FIG. 2 is a three-dimensional view of an implementation of a cutting member of the saw chain of FIG. 1, consisting of a material compound and a welded seam.

FIG. 3 is a cross-section of the cutting tooth of a cutting member according to the present disclosure.

FIG. 4 is a material compound with schematically depicted punching blanks.

DETAILED DESCRIPTION

Figure 5:
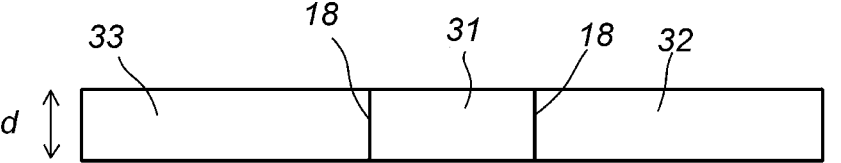
FIG. 5 is a cross-section of the material compound of FIG. 4 along the line V-V.

FIG. 1 shows a side view of a saw chain, as is explained in more detail by way of example in the European patent application EP 0 592 389 B1. The saw chain labelled throughout with the reference numeral 10 has a series of cutting members 11 and driving members 12. The cutting members 11 are connected to the drive links together with counter links 13 via rivets 14. Moreover, in the depicted example, drive links are also connected to one another by rivets 14 via interlinks 15. Each cutting member 11 has a support part 16 made of constructive steel and a cutting part 17 made of high speed steel. The support part 16 and the cutting part 17 are connected to each other along a welded seam 18. The cutting members 11 have depth limiters 20 which, in the implementation of FIG. 1, consist completely of the unbreakable steel alloy of the support part 16.

FIG. 2 shows a three-dimensional view of an implementation of a cutting member 11. The cutting member 11 of the implementation of FIG. 2 substantially corresponds to the cutting member 11 of the saw chain of FIG. 1. The support part 16 is made of tool steel and is connected to the cutting part 17 made of high speed steel by means of welded seams 18. The cutting teeth 19 and, in contrast to the variant of FIG. 1, at least one partial region of a depth limiter 20 is formed from the cutting part 17. As a result of the clearly improved service life of the cutting teeth, the depth limiter in particular is also subjected to increased abrasion attrition. Since the depth limiter is also designed from high speed steel, this can withstand the increased abrasion attrition well. The thickness of the cutting part and support part are labelled in FIG. 2 with $d_1$ and $d_2$.

FIG. 3 shows a cross-section of a cutting member in the region of the cutting tooth 19. The cross-sectional depiction shows, in particular, the position and the shape of the welded seam 18 when transitioning from the support part 16 to the cutting part 17 particularly clearly. The smaller welded seam width of the root seam on the cutting tooth outside 22 and the larger welded seam width or the upper track on the tension-reduced cutting tooth inside 21 the cutting tooth 19 are also depicted.

FIG. 4 shows a material compound strip 30 for producing cutting members for the saw chain according to the present disclosure. The material compound strip is produced by means of laser or electron beam welding devices and the welded seam course is arranged by targeted positioning of the compound strip when removing the cutting member blanks and subsequent reshaping in such a way that the smaller welded seam width of the root seam is on the outside 22 of the later cutting tooth 19, and the larger welded seam width or the upper track with possible undercuts or with possible welded seam grooves is on the inside 21 of tension-reduced cutting tooth that arises during reshaping of the cutting tooth. This can be easily seen, in particular, in the cross-sectional depiction of FIG. 3.

As can be seen in FIG. 4, the material compound strip 30 made of a first central flat strip material 31 made of high speed steel is welded on its two strip edges along a second or third flat strip material 32, 33 along welding lines 18. The schematically indicated punching contours 34, 35 are arranged in such a way that the support part 16 of the later cutting members 11 is in the second and third flat strip material 32, 33 made of tool steel, while the cutting part 17 is arranged in the region of the first central flat strip material 31 made of high speed steel. It can be seen that cutting members 11 with particularly low material loss or right/left cutting members made of the material compound strip can be separated by targeted arrangement of the punch contours on both sides of the flat high speed steel strip 31. In this implementation, the punching contours 34, 35 are arranged in such a way that the depth limiter 20 is completely in the region of the second and third strip material 32, 33, i.e. as is implemented in FIG. 1 without high speed steel. Yet, it can also be seen that the implementation of FIG. 2 would be able to be produced by targeted choice of the geometry of the punching contours 34, 35, in which the tip of the depth limiter 20 would then reach into the first strip material made of high speed steel.

The flat strip materials can have the same or different thicknesses. In the present context, "thickness" means the dimension of the strip materials perpendicular to their planar extension. In FIG. 5, a cross-section along the line V-V from FIG. 4 is depicted. In this variant, the strip materials 31, 32, 33 have the same thickness d. In this variant, there is no step on the welded seams 18.

Figure 6:
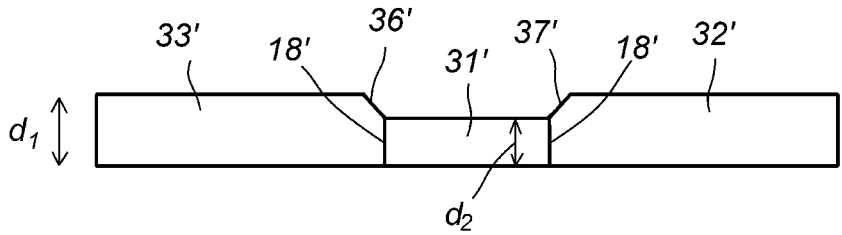
FIG. 6 is a cross-section corresponding to FIG. 5 of a variant of a compound material, in which the high speed steel has a smaller thickness $d_2$.
Figure 7:
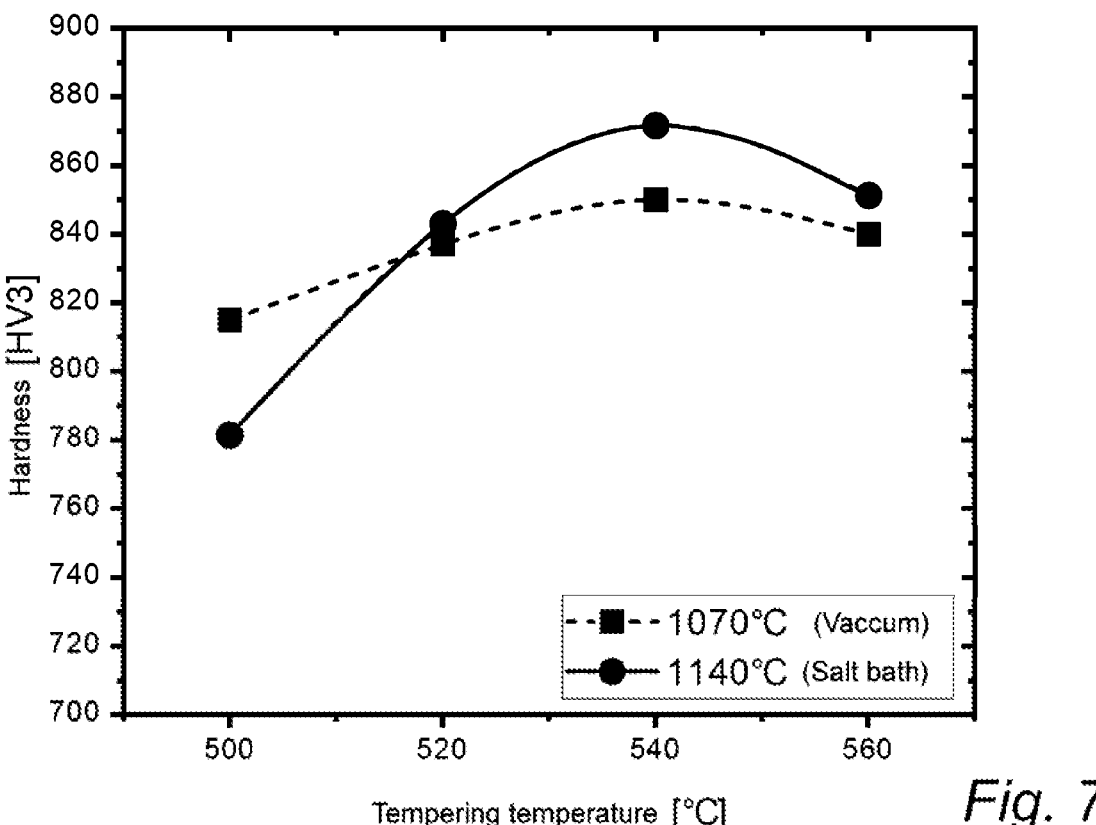
FIG. 7 is a diagram that reproduces the influence of curing temperature and tempering temperature on the hardness of the cutting material.

In the alternative implementation depicted in FIG. 6, the first flat strip material 31', made of high speed steel, has a smaller thickness $d_2$ than the thickness $d_1$ of the flat strip materials 32', 33'. In this variant, steps emerge on the welded seams 18' which can be flattened by post-processing steps. In order to lessen the difference in thickness at the outset, as depicted in FIG. 6, the hems 36', 37' of the flat strip materials 32, 33, said hems being adjacent to the welded seams 18', can be chamfered.

Comparative Trials

The advantageous use of saw chains in which the cutting members consist of the material compound is depicted the following comparative trials.

1. Heat Treatment

Better attrition behaviour than a conventional carbon steel is achieved by the use of a high speed steel in the material compound (see also the attrition tests presented under 2). However, the use of this high speed steel in turn requires an increased austenitizing temperature. Accordingly, the development in terms of material of a suitable support strip for the material compound is of great significance. Thus, heat treatment trials have been carried out, wherein samples have been cured in a salt bath and then tempered twice. The hardness and the tensile strength have then been determined.

The influence of curing or tempering temperature on said properties is summarized in Table 1 below. It can be seen that the strength values of the support material according to the disclosure are, regardless of the heat treatment, higher than the strength values of the conventional carbon steel.

TABLE 1

Influence of curing temperature and tempering temperature
on the tensile strength and hardness of different support
strip materials after a short-term heat treatment in
a salt bath (salt bath curing of up to 10 min).

| Support strip material | Curing temperature [° C.] | Tempering temperature [° C.] | Tensile strength [MPa] | Hardness [HV] |
|---|---|---|---|---|
| 63NiNb4 | 810 | 250 | 2205 | 649 |
| | | 270 | 2090 | 630 |
| | 830 | 250 | 2205 | 625 |
| | | 270 | 2035 | 601 |
| Present Disclosure | 1140 | 520 | 2330 | 658 |
| | | 540 | 2430 | 660 |
| | | 560 | 2264 | 652 |
| | 1160 | 520 | 2140 | 674 |
| | | 540 | 2380 | 703 |
| | | 560 | 2460 | 712 |

Furthermore, heat treatment trials have been carried out, wherein samples were cured in a vacuum oven at different temperatures and then tempered twice at 550° C. The hardness and the tensile strength were then also determined. The influence of curing or tempering temperature on tensile strength and hardness are summarised in Table 2 below.

TABLE 2

Influence of curing temperature and tempering temperature on the
tensile strength and hardness on the support strip according to the
disclosure after a long-term heat treatment in a vacuum (vacuum
curing over more than 60 min).

| Support strip material | Curing temperature [° C.] | Tempering temperature [° C.] | Tensile strength [MPa] | Hardness [HV] |
|---|---|---|---|---|
| Present Disclosure | 1030 | 550 | 2370 | 700 |
| | 1050 | | 2505 | 742 |
| | 1070 | | 2435 | 735 |

2. Attrition Resistance

In order to assess the attrition resistance of the material compound, machining attempts have been carried out on so-called wood shaving lightweight boards. Such boards are produced from long-stranded planed spruce or pine wood, wherein these fibres are bound by cement. Such attrition trials simulate extremely practical cases, which are particularly relevant with regard to frequently occurring abrasive contamination in wood, such as sand, for example, or typically in the felling region as a result of soil.

In general, the attrition behaviour of a high speed steel correlates to its hardness and toughness. An optimum combination of these two properties is obtained by the curing and tempering of the high speed steel at slightly higher temperatures of the secondary curing maximum. The secondary curing potential is determined by the curing temperature and the holding period. Thus, with suitable choice of these parameters with different hardness technologies (salt bath curing or vacuum curing), the same hardness can be set. By way of example, FIG. 5 shows the curing-tempering curve of the cutting material, of the material compound according to the disclosure which, on the one hand, has been cured in the vacuum and, on the other hand, in the salt bath. It turns out that, regardless of the curing technology, equivalent hardness can be achieved in the cutting material and thus an equivalent attrition resistance is to be expected.

For such trials, wood plane knives made of the cutting materials of the material compound according to the disclosure have been concretely produced from a high speed steel cutting part (composition (in % by weight): 0.75% C, 0.3% Si, 0.25% Mn, 4% Cr, 5% Mo, 1% V, 1% W, 8% Co) and a tool steel support (composition (in % by weight): 0.55% C, 1% Si, 0.4% Mn, 8% Cr, 0.5% Mo, 0.5% V) with a cutting angle of 47 degrees. These wood plane knives have been compared to geometrically corresponding wood plane knives made of a conventional carbon steel of the class 63NiNb4, as is conventionally used in the sawing industry. The assessment of the attrition progress has been carried out by measuring the cutting geometry after defined machining paths ($L_W$).

Figures 8, 9:
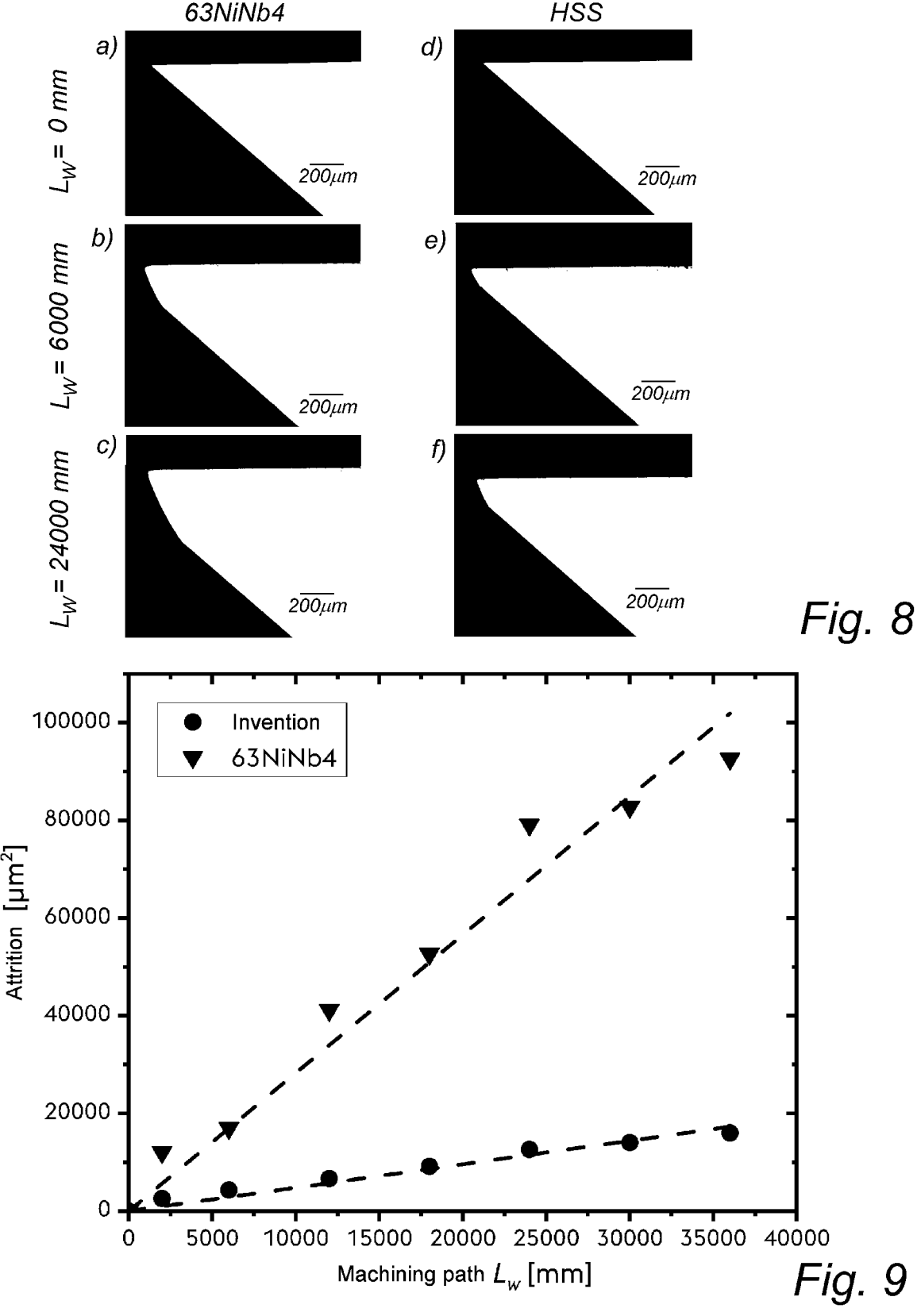
FIG. 8 shows comparable recordings of progressive attrition on cutting edges according to the present disclosure and cutting edges of the prior art.
FIG. 9 a diagram of the quantitatively measured attrition as a function of the machining value.

FIG. 8 representatively shows the continuous attrition of the cutting edges. The partial depictions a), b) and c) in FIG. 8 show the attrition of the conventional wood plane knives made of carbon steel before the start of the attrition trial ($L_W$=0 mm or with machining paths of 6,000 mm and 24,000 mm. The partial depictions d), e) and f) in FIG. 8 show corresponding results with wood plane knives, the cutting edge of which consists of high speed steel. It can clearly be seen that the attrition on the cutting edge of the convention carbon steel is significantly higher than with high speed steel of the material compound.

In order to quantify the attrition progress, the geometric surface loss has been measured and applied across the machining path. The corresponding results (quantitatively measured attrition as a function of the machining path) are depicted in the diagram of FIG. 9 for cutting edges made of carbon steel 63NiNb4 or a cutting material of the material compound according to the disclosure. The data can be reproduced easily by regression straight lines, attrition rates being able to be ascertained from the inclination thereof. Thus, for the carbon steel 63NiNb4, an attrition rate of 2.8304 $\mu m^2$/mm, and for the high speed steel of the material compound according to the disclosure, an attrition rate of 0.481 $\mu m^2$/mm emerge. This evaluation makes clear the particularly advantageous use of cutting members, which are produced from the material compound according to the disclosure.

The invention claimed is:

1. A cutting member for a saw chain, the cutting member consisting of a compound material consisting of a support part, a cutting part, and a welded seam connecting the support part and the cutting part, wherein the cutting part is made of a high speed steel, wherein the support part is made from a tool steel that has the following composition in % by weight:

| | |
|---|---|
| Carbon (C) | 0.4 to 1.0 |
| Silicon (Si) | up to 1.8 |
| Manganese (Mn) | up to 0.6 |
| Chromium (Cr) | 4.5 to 12 |
| Molybdenum (Mo) | 0.5 to 3 |
| Vanadium (V) | up to 2 |

Iron (Fe) and impurities as the remainder, wherein the tool steel of the support part is in a quenched and tempered state, has a hardness between 630 and 750 HV and a tensile strength between 2100 and 2500 MPa, obtained by hardening the compound material at a temperature above austenitizing temperature of the high speed steel, quenching and tempering, wherein the temperature above the austenitizing temperature range is within a range from 1050 to below 1200° C.

2. The cutting member according to claim 1, wherein the tool steel of the support part has the following composition in % by weight:

| | |
|---|---|
| Carbon (C) | 0.45 to 0.8 |
| Silicon (Si) | up to 1.3 |
| Manganese (Mn) | up to 0.6 |
| Chromium (Cr) | 6 to 10 |
| Molybdenum (Mo) | up-0.5 to 1.6 |
| Vanadium (V) | up to 1 |

Iron (Fe) and impurities as the remainder.

3. The cutting member according to claim 1, wherein the high speed steel of the cutting part has the following composition in % by weight:

| | |
|---|---|
| Carbon (C) | 0.5 to 1.1 |
| Silicon (Si) | up to 0.5 |
| Manganese (Mn) | up to 0.5 |
| Chromium (Cr) | 3.5 to 4.5 |
| Molybdenum (Mo) | 2 to 6 |
| Vanadium (V) | 0.5 to 3.0 |
| Tungsten (W) | up to 3 |
| Cobalt (Co) | up to 10 |

Iron (Fe) and impurities as the remainder.

4. The cutting member according to claim 1, wherein the welded seam connecting the tool steel of the support part and the high speed steel of the cutting part is obtained by laser or electron beam welding, wherein the welded seam is located in a less loaded region of the cutting member which is subjected to reduced loads during operation.

5. The cutting member according to claim 4, wherein a geometrically narrower lower track of the welded seam is arranged on the outside of the cutting member and an upper track of the welded seam is arranged on the inside of the cutting member.

6. The cutting member according to claim 1, wherein the cutting member has a depth limiter that at least partially consists of high speed steel.

7. The cutting member according to claim 1, wherein the cutting part has a smaller thickness than the support part.

8. A saw chain for motorised chainsaws, comprising: drive links and a cutting member according to claim 1.

\* \* \* \* \*